United States Patent [19]

Kadunce

[11] Patent Number: 4,896,628

[45] Date of Patent: Jan. 30, 1990

[54] ANIMAL FEEDING DEVICE

[75] Inventor: Leo Kadunce, Langhorne, Pa.

[73] Assignee: Self Seal Container Corp., Bridgeport, Pa.

[21] Appl. No.: 186,850

[22] Filed: Apr. 27, 1988

[51] Int. Cl.$^4$ .......................................... A01K 39/014
[52] U.S. Cl. ................................... 119/52.2; 119/52.1
[58] Field of Search ...................... 119/52 R, 53, 52 B, 119/51.13, 51.11

[56] References Cited

U.S. PATENT DOCUMENTS

| 954,968 | 4/1910 | Jocy | 119/52 R |
|---|---|---|---|
| 1,502,847 | 7/1924 | Collins | 119/52 R |
| 1,891,042 | 12/1932 | Benoit | 119/52 R |
| 2,383,732 | 8/1945 | Niersbach | 119/52 R |
| 2,808,028 | 10/1957 | Landgraf | 119/53 |
| 2,854,949 | 10/1958 | Wiggins | 119/53 |
| 2,941,506 | 6/1960 | Fulton | 119/53 |
| 4,747,370 | 5/1988 | Olson | 119/52 R |
| 4,800,844 | 1/1989 | Van Gilst | 119/52 R |

FOREIGN PATENT DOCUMENTS

| 616106 | 3/1961 | Canada | 119/52 R |
|---|---|---|---|
| 79753 | 5/1894 | Fed. Rep. of Germany | 119/52 R |
| 1229999 | 5/1959 | France | 119/52 R |
| 1267911 | 6/1961 | France | 119/52 R |
| 412461 | 11/1966 | Switzerland | 119/52 R |
| 613603 | 10/1979 | Switzerland | 119/52 R |

Primary Examiner—John Weiss
Attorney, Agent, or Firm—Sperry, Zoda & Kane

[57] ABSTRACT

An animal feeding device includes a food container preferably shaped as a composite cylindrical can with seamed metal closures, one of which is easily openable. A base member is attachable to the food container through a food distribution coupling to secure the open end of the food container thereadjacent. The food distribution coupling includes a retaining ring for detachably securing the food distribution coupling to the food container to allow food to fall downwardly therefrom through the opening into a food distribution chamber in the coupling therebelow. A plurality of food distribution ports are adapted to receive food from the food distribution chamber for carrying same into the food trough of the base member. The feeding device is capable of stacking by attaching successive containers to the bottom of successively positioned base members through the use of additional retaining rings beneath food container.

18 Claims, 2 Drawing Sheets

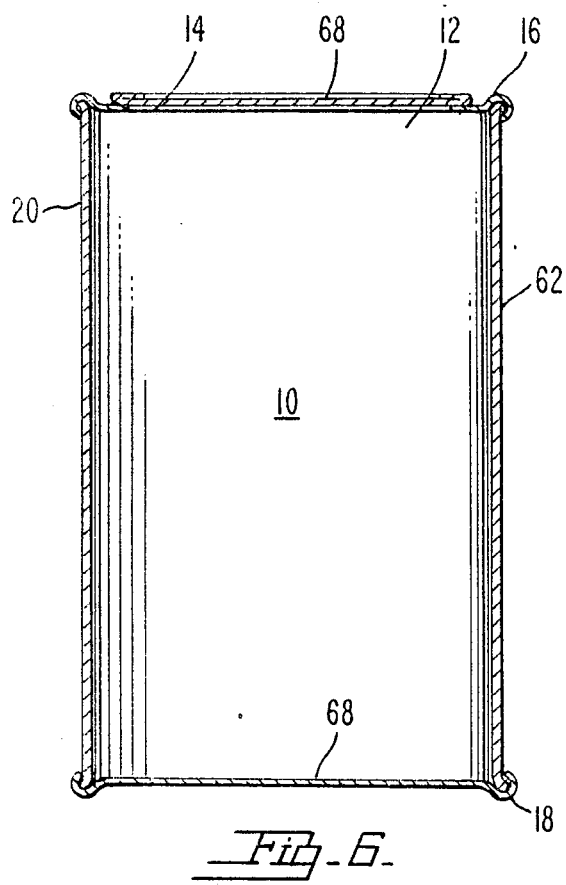
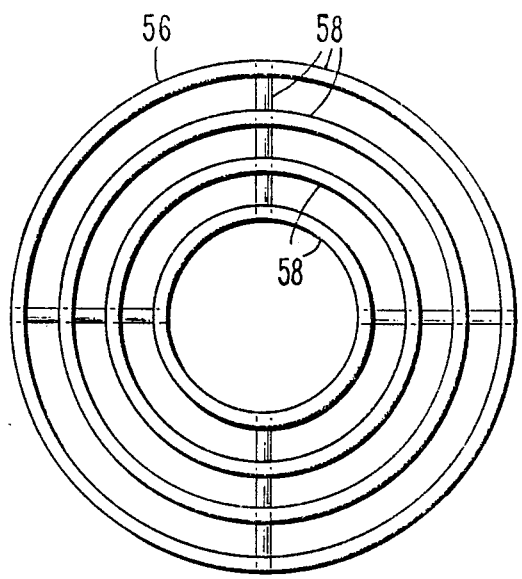
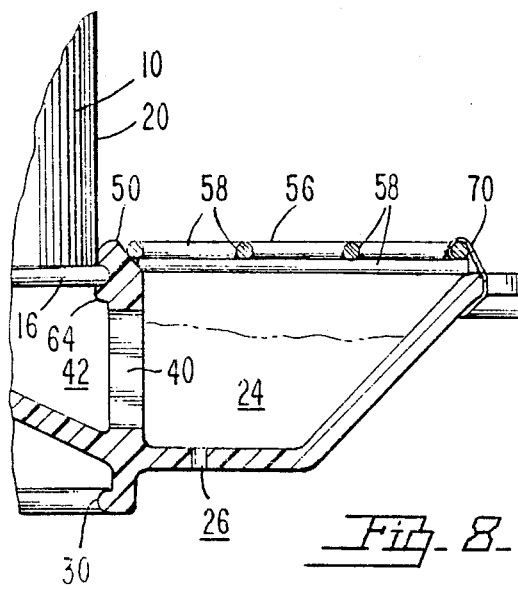
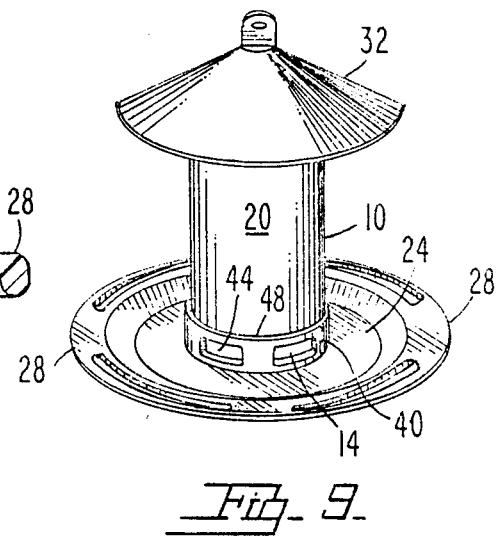

ANIMAL FEEDING DEVICE

BACKGROUND OF THE INVENTION

1. Field Of The Invention

The present invention deals with the field of devices for feeding animals. More particularly the present invention is specifically pertinent to bird feeders.

Prior art devices normally are in two categories: one, permanent stationary bird feeders and two, disposable or "throw away" bird feeders. The present invention provides a compromise between these two types of bird feeders wherein the base and top are stationary and only a food container or cartridge is replaceable.

2. Description Of The Prior Art

Many prior art devices have been designed as bird feeders such as U.S. Pat. No. 2,705,938 patented Apr. 12, 1955 to W. Greenough on a Feeder For Birds; U.S. Pat. No. 2,786,446 patented Mar. 26, 1957 to W. Newman on a Bird Feeder Having A Bird Supporting Platform; U.S. Pat. No. 3,012,539 patented Dec. 12, 1961 to H. Warren on a Poultry Feeder; U.S. Pat. No. 3,136,296 patented June 9, 1964 to P. Luin on a Bird Feeder; U.S. Pat. No. 3,244,150 patented Apr. 5, 1966 to B. Blair on a Bird Feeder; U.S. Pat. No. 3,316,884 patented May 2, 1967 to R. Viggars on a Feeding Device; U.S. Pat. No. 3,372,676 patented Mar. 12, 1968 to R. Williams on a Cardinal Bird Feeder; U.S. Pat. No. 4,102,308 patented July 25, 1978 to P. Kilham on a Bird Feeder; U.S. Pat. No. 4,144,842 patented Mar. 20, 1979 to A. Schlising on an Access Limiting Bird Feeder; U.S. Pat. No. 4,216,742 patented Aug. 12, 1980 to J. Kirchhofer on a Multi-Tiered Cage And Feed Device; U.S. Pat. No. 4,223,637 patented Sept. 23, 1980 to H. Keefe on a Bird Feeder; U.S. Pat. No. 4,242,984 patented Jan. 6, 1981 to E. Smith on a Combination Container and Feeder; U.S. Pat. No. 4,328,636 patented May 11, 1982 to R. Johnson on a Device For Insect Control And Method; and U.S. Pat. No. 4,570,575 patented Feb. 18, 1986 to C. Hinz on a Combined Bird Feeder Container And Bird Feeder.

SUMMARY OF THE INVENTION

The present invention provides an animal feeding device which can be particularly usable for feeding birds which includes a food container which can be cylindrical and defines a food reservoir therein for holding food to be dispensed therefrom. A food delivery opening which is sealed during packaging and opened at the time of usage is defined in one end of the food container.

The food container preferably includes a lower rim edge means and an upper rim edge means extending outwardly therefrom and includes side wall means of composite fiber material. Preferably the composite fiber material is generally cylindrical and the upper and lower edge means are formed of metal edge crimped closures one of which defines the food delivery opening being selectively sealable.

A base member is included positioned below the food container which includes a food trough for holding food therein for and until removal by feeding animals. The food trough defines drainage apertures extending outwardly therefrom to facilitate drainage of water which may be captured within the food trough under certain operating conditions. The base member further includes a perch positioned adjacent to the food trough such that the birds can hold on during feeding. The perch preferably extends circumferentially around the annual shaped food trough in a preferred configuration of the present invention.

The present invention may include supplementary retaining lip means fixedly mounted to the lower surface of each base member to thereby facilitate securement of additional identically constructed food containers below the base member to facilitate tiering of the bird feeding stations of the present invention.

A top member is also defined in the present invention which is engageable with respect to the upper rim edge means of the food container to facilitate protection from undesirable environmental conditions such as rain and falling leaves, etc. The top member extends outwardly to cover the lateral extent of the food trough in a vertical direction.

The top member may further include a suspension bracket to facilitate hanging of the animal feeding device from trees. Also the top member includes a top retaining lip detachably engageable with respect to the upper rim edge to facilitate securement of the top member with respect to the food container. A closure stop may be defined immediately above and adjacent the top retaining lip to facilitate firm securement of the top member with respect to the food container.

A food distribution coupling is attached with respect to the base member and is adapted to be detachable with respect to the lower rim edge of the food container for movably retaining it with respect to the base member to facilitate selective distribution of food from the food reservoir into the food trough therebelow. The food distribution coupling may more specifically include a food distribution chamber positioned below the food delivery opening of the food container being retained by the food distribution coupling. This food distribution chamber is adapted to receive food from the food reservoir for guiding it into the food trough therebelow. A food distribution port is positioned in communication with respect to the food distribution chamber and is adapted to receive therefrom for more specific guiding of this food into the food trough of the base member.

A floor may be defined in the food distribution chamber which is inclined circumferentially outwardly toward the food distribution ports to facilitate food flow from the food distribution chamber outwardly through the food distribution ports.

A retaining ring means is attached with respect to the base member and includes a base retaining lip detachably engageable with respect to the lower rim edge of a food container to secure it movably with respect to the retaining ring. This food container is specifically movable with respect to the retaining ring between a (1) food retaining position extending across and closing the food distribution port and (2) a food supplying position for releasing the food downwardly through the food delivery opening into the food distribution chamber therebelow. The retaining ring is preferably formed of a flexibly resilient material to facilitate the respective attachment and detachment of the food container thereto.

A squirrel protection means such as a grating or the like may extend across the upper surface of the food trough to prevent squirrels from directly feeding therefrom while still allowing birds to feed through the openings defined in the grating. Furthermore supplementary base members are attachable with respect to the lower edges of additional food containers to allow tiering of food troughs by successive placement of food containers and base members downwardly from the top member.

It is an object of the present invention to provide an animal feeding device being particularly usable as a bird feeder wherein the unit is not entirely disposable nor entirely permanent.

It is an object of the present invention to provide an animal feeding device being particularly usable as a bird feeder wherein initial cost is minimized.

It is an object of the present invention to provide an animal feeding device being particularly usable as a bird feeder wherein maintenance requirements are minimal.

It is an object of the present invention to provide an animal feeding device being particularly usable as a bird feeder wherein replacement of food holding containers or cartridges is greatly facilitated.

It is an object of the present invention to provide an animal feeding device being particularly usable as a bird feeder wherein squirrel proofing is an available accessory.

It is an object of the present invention to provide an animal feeding device being particularly usable as a bird feeder wherein tiering of successive feeding stations is easily achievable.

It is an object of the present invention to provide an animal feeding device being particularly usable as a bird feeder wherein the external appearance is aesthetically pleasing.

It is an object of the present invention to provide an animal feeding device being particularly usable as a bird feeder wherein various feeding stations can be provided each having a different type of feed for a different type of bird or animal.

It is an object of the present invention to provide an animal feeding device being particularly usable as a bird feeder wherein assembly of the entire animal feeder after purchase is quick and easy.

It is an object of the present invention to provide an animal feeding device being particularly usable as a bird feeder wherein the food container is movable within the feeding device between a food supplying position and a food retaining position in an extremely simple and easy manner.

It is an object of the present invention to provide an animal feeding device being particularly usable as a bird feeder wherein the elements of the feeding device are collapsible into a small dimension to facilitate packaging and storage thereof.

It is an object of the present invention to provide an animal feeding device being particularly usable as a bird feeder wherein perch means are included immediately adjacent to each feed trough to greatly facilitate bird feeding.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 6 is a cross-sectional view of an embodiment of a food container prior to opening of the food delivery opening thereof;

FIG. 7 is a top plan view of an embodiment of the squirrel protection grating of the present invention;

FIG. 8 is a partial cross-sectional view of an embodiment of the animal feeding device of the present invention showing the squirrel protection grating in place; and FIG. 9 is a front perspective view of an embodiment of the animal feeding device of the present invention shown in the food delivery position.

DETAILED DESCRIPTION OF THE PREFERRED EMBODIMENT

Figure 1:
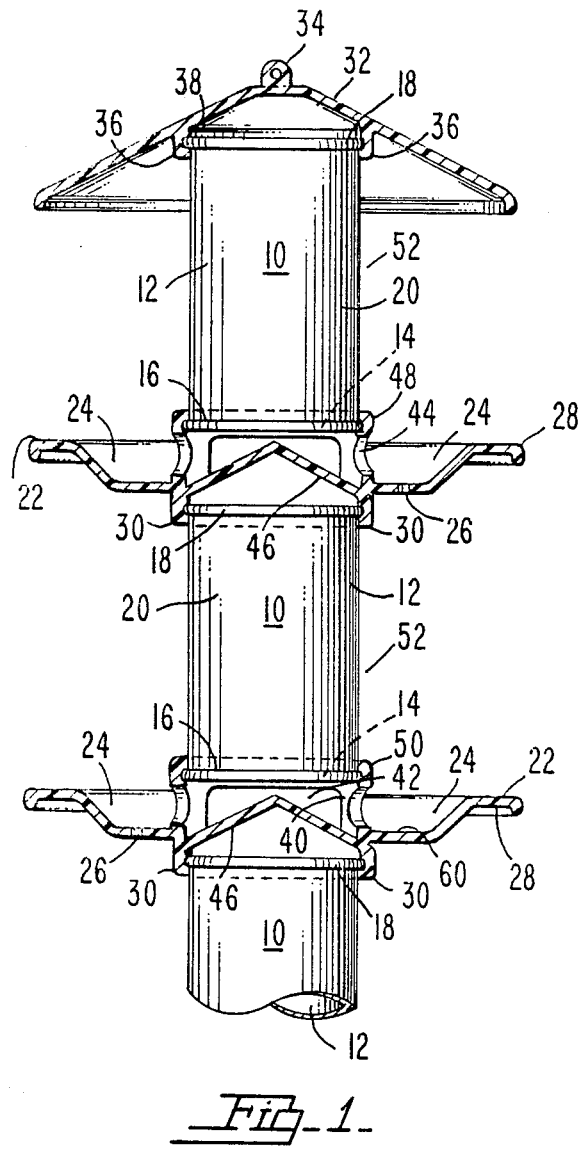
FIG. 1 is a front plan view of an embodiment of the animal feeding device of the present invention showing successive food containers and base members as vertically tiered.
Figure 2:
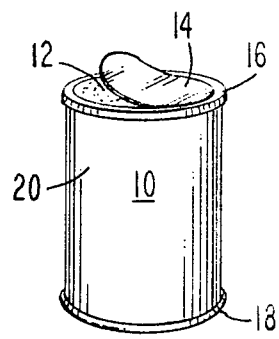
FIG. 2 is a front perspective view of an embodiment of a food container of the present invention.
Figure 3:
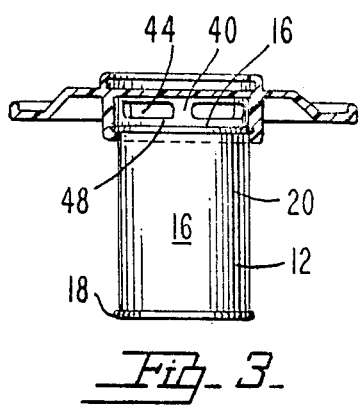
FIG. 3 is a front plan view of an embodiment of the base member and food container of the present invention shown in the initial stage of assembly thereof.
Figure 4:
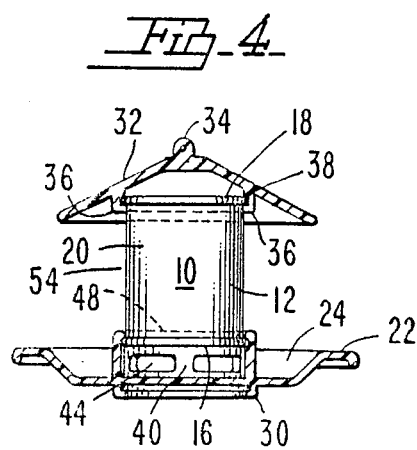
FIG. 4 is a front plan view of an embodiment of the present invention shown in the food retaining position.
Figure 5:
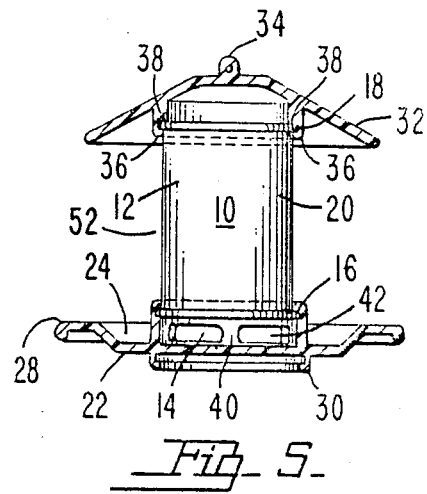
FIG. 5 is a front plan view of an embodiment of an animal feeding device of the present invention showing the food container in the food supplying position.

The present invention provides an animal feeding device which includes a food container 10 which defines a food reservoir 12 therein. Food container 10 is preferably cylindrical with a composite fiber material 62 forming the side walls 20 thereof. Preferably the food container has sealed metal closure members at 68 at both opposite ends which are secured with respect to the composite fiber material 62 of the cylindrical side walls 20.

A food delivery opening 14 is preferably defined in the lower end of the food reservoir 12. Preferably food delivery opening 14 is formed by a removable seal over the lower sealed metal closure 68.

The lower sealed metal closure preferably defines a lower rim edge means 16 extending slightly circumferentially outwardly from the side walls 20. In a similar fashion an upper rim edge means 18 is defined by the upper sealed metal closure to extend slightly outwardly circumferentially from the composite side wall 20.

A base member 22 is included in the present invention and defines a food trough 24 preferably extending circumferentially thereabout. The food trough 24 includes drainage apertures 26 defined therein to facilitate drainage of water and other unwanted fluids from the food trough 24. A perch means 28 is preferably positioned adjacent the food trough 24 to facilitate birds during feeding. Perch means 28 preferably extends circumferentially about the food trough 28. Base member 22 is adapted to be secured with respect to the food container 10.

A top member 32 is included which is adapted to be secured with respect to the upper end of food container 10 and includes a top retaining lip means to facilitate securement with respect to the upper rim edge means 18 of food container 10. The top member 32 also will preferably define a closure stop 38 immediately above the top retaining lip means 36 to facilitate securement therebetween of the upper rim edge means 18. The top member is adapted to be suspended from a tree or other item thereabove and therefore also preferably includes a suspension bracket 34 secured to the upper portion thereof.

A food distribution coupling 40 is fixedly secured with respect to the base member 22 and defines a food-distribution chamber 42 therein adapted to receive food from a food container 10 which is detachably secured with respect to a base member 22.

Food distribution coupling 40 includes a retaining ring means 48 having a base retaining lip means 50 extending inwardly therefrom. Retaining ring means 48 is adapted to be engageable with respect to the lower rim edge means 16 of a food container 10 for securing it in a detachable movable manner with respect to the base member 22. The food distribution coupling further includes a food distribution port means 44 therein adapted to allow food to travel downwardly from the food distribution chamber 42 directly into the food trough 28 located downwardly and peripherally outwardly therefrom. To facilitate this movement a floor means 46 may be defined in the lower portion of the food distribution chamber 42 which is inclined downwardly and outwardly to the food distribution ports 44 and further to the food trough 24.

The food container 10 is adapted to have the lower rim edge means 16 thereof pushed into engagement with the normally flexibly resilient food distribution coupling 40 by movement of the lower rim edge means 16 below the base retaining lip 50. Once this position is achieved the food container 10 can be movable between an upward position which is the food supplying position 52 and a downward position which is the food retaining position 54. In the food supplying position 52 the food delivery opening 14 is directly accessible to the food distribution chamber 42 and food is allowed to flow outwardly through the food distribution port 44 into the food trough 24. On the other hand when the food container 10 is in the food retaining position 54 the side walls 20 thereof will extend across the food distribution ports 44 and prevent the movement of food from the food distribution chamber 42 outwardly into the food trough 24. The normal operating position of the food container 10 will of course be the food supplying position 52. Normally the food container 10 will be capable of being maintained in the supplying position 52 merely by the adherence between the flexibly resilient retaining ring means 48 and the lower rim edge means 16 of container 10. The holding of the food container 10 in this position will be further facilitated whenever the animal feeding device of the present invention is suspended from above since the weight of the base member 22 and any successive stations therebelow will tend to pull downwardly on the base member and urge the orientation of the food container 10 and the retaining ring 48 into the food supplying position 52.

However under certain circumstances it may be desirable to provide two vertically adjacent inwardly extending lip members 64 in the area of the base retaining lip means 50 to further facilitate retainment of the food container 10 in the food delivery position 52.

Stacking of successive tiers of feeding stations is achievable in the present invention by the inclusion of supplementary retaining lip means 30 defined in the undersurface of each base member 22. These supplementary retaining lip means 30 are constructed similar to the top retaining lip means 36 of the top member 32. As such a food container 10 can be secured to the bottom of base member 22 and specifically can be secured to the supplementary retaining lip means 30 in such a manner as to be suspended downwardly therefrom in a similar manner as the first food container is suspended downwardly from top member 32. As such an additional base member 22 may be constructed identically to the original base member 22 may be secured to the lower portion of the food container 10 thereby defining a second feeding trough therebelow which can be filled with an alternative type of food to attract a different class of birds. Successive placement of supplementary base members 60 can be positioned downwardly from the top member 32 and place any number of individual feeding stations as desired by the user.

It may be desirable to provide a squirrel protection means 56 which may take the form of grating or screening means 58 which extends across the upper surface of the food trough 24. With this configuration thus shown in FIGS. 7 and 8 squirrels will not be able to have access to the feed in the trough whereas birds will be capable of reaching between the grating and obtaining access to the food. It may be advisable to provide a clip 70 which can secure the grating with respect to the base member 22 as desired.

In operation the present invention will normally be packaged with the top member 32 clipped or otherwise secured with respect to the base member 22 to be used associated therewith. The food containers 10 will normally be provided with each kit or separately packaged. Installation will require initially unsealing of the food delivery opening 14 of the food container 10. This open end 14 will then be pushed into the resilient food distribution coupling 40 and urged toward each other to move the food container 10 into the food retaining position 54. This action all be performed with the base member in the inverted position such that food will not fall outwardly from the food reservoir 12. Once the food container 10 is moved to the food retaining position 54 the entire unit is inverted and the top member 32 is attached to the upper rim edge means 18 of the food container 10. The final step will be movement of the food container 10 from the food retaining position 54 to the food supplying position 52 followed by the suspension of top member 32 using suspension brackets 34 from a tree or other similar environmental structure.

Replacement of individual food containers 10 or tiering by the inclusion of additional food containers and additional base members can be achieved as desired.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An animal feeding device being particularly usable as a bird feeder comprising:
   (a) a food container defining a food reservoir therein and a food delivery opening adapted to release food downwardly from said food reservoir, said food container including a lower rim edge means and an upper rim edge means extending outwardly therefrom;
   (b) a base member positioned below said food container and including a food trough for holding food therein for removal by feeding animals;
   (c) a top member being engageable with respect to said upper rim edge means of said food container to facilitate protection thereof from undesirable environmental conditions;
   (d) a food distribution coupling attached with respect to said base member, said food distribution coupling being adapted to be detachable with respect to said lower rim edge means of said food container for movably retaining same with respect to said base member to facilitate selective distribution of food from said food reservoir thereof into said feed trough, said food distribution coupling including:
(1) a food distribution chamber positioned below said food delivery opening of said food container being retained by said food distribution coupling, said food distribution chamber adapted to receive food from said food reservoir and supply same to move into said feed trough;
(2) food distribution port means in communication with respect to said food distribution chamber and adapted to receive food therefrom for guiding movement of same into said food trough defined in said base member;
(3) a retaining ring means attached with respect to said base member and including a base retaining lip means being detachably engageable with respect to said lower rim edge means of said food container to secure same movably with respect to said retaining ring means, said base retaining lip means including two vertically adjacent inwardly extending engaging lip members to facilitate retainment of said lower rim edge means therein, said food container being specifically movable with respect to said base retaining ring means between a food retaining position extending across and closing said food distribution port means and a food supplying position for releasing of food downwardly through said food delivery opening into said food distribution chamber therebelow to allow movement of food through said food distribution port means into said food trough.

2. An animal feeding device being particularly usable as a bird feeder as defined in claim 1 wherein said top member extends outwardly to vertically cover said food trough located vertically therebelow.

3. An animal feeding device particularly usable as a bird feeder as defined in claim 1 wherein said base member further includes a perch means positioned thereadjacent.

4. An animal feeding device being particularly usable as a bird feeder as defined in claim 1 wherein said food trough is generally circular and extends around said food distribution chamber.

5. An animal feeding device being particularly usable as a bird feeder as defined in claim 1 wherein said food distribution coupling includes a floor means within said food distribution chamber which is inclined toward said food distribution port means to facilitate food flow from said food distribution chamber outwardly through said food distribution port means.

6. An animal feeding device being particularly usable as a bird feeder as defined in claim 1 wherein said food container includes side wall means of composite fiber material and said upper edge means and said lower edge means are of metal material.

7. An animal feeding device being particularly usable as a bird feeder as defined in claim 1 wherein said top member includes a suspension bracket thereon to facilitate hanging of the animal feeding device from trees and the like.

8. An animal feeding device being particularly usable as a bird feeder as defined in claim 1 wherein said top member includes a top retaining lip means detachably engageable with respect to said upper rim edge means to facilitate securement of said top member with respect to said food container.

9. An animal feeding device being particularly usable as a bird feeder as defined in claim 8 wherein said top member further defines a closure stop immediately adjacent and above said top retaining lip means to facilitate firm securement of said top member with respect to said food container.

10. An animal feeding device being particularly usable as a bird feeder as defined in claim 1 wherein said food container is generally cylindrical.

11. An animal feeding device being particularly usable as a bird feeder as defined in claim 1 wherein said base member includes supplementary retaining lip means fixedly mounted to the lower surface thereof to facilitate securement of additional of said food containers below said base member.

12. An animal feeding device being particularly usable as a bird feeder as defined in claim 11 further including supplementary base members attachable to the lower edges of said additional food containers to allow tiering of said food troughs.

13. An animal feeding device being, particularly usable as a bird feeder as defined in claim 1 further including squirrel protection means comprising a grating means extending across said food trough to prevent squirrels from directly feeding therefrom and yet still allow full access by birds.

14. An animal feeding device being particularly usable as a bird feeder as defined in claim 13 wherein said grating means comprises a screening means.

15. An animal feeding device being particularly usable as a bird feeder as defined in claim 13 further including clip means securable with respect to said grating means and the outer portion of said base member to facilitate retainment of said grating means in place extending over said feed trough.

16. An animal feeding device being particularly usable as a bird feeder as defined in claim 1 wherein said base member includes drainage apertures defined in fluid flow communication with respect to said food trough to allow water drainage therefrom.

17. An animal feeding device being particularly usable as a bird feeder as defined in claim 1 wherein said retaining ring means is formed of flexibly resilient material to facilitate respective attachment and detachment of said food containers thereto.

18. An animal feeding device being particularly usable as a bird feeder comprising:
(a) a food container being cylindrical and defining a food reservoir therein and a food delivery opening adapted to release food downwardly from said food reservoir, said food container including a lower rim edge means and an upper rim edge means extending outwardly therefrom, said food container further including side wall means of composite fiber material, said upper edge means and said lower edge means being of metal material;
(b) a base member positioned below said food container which includes:
(1) a food trough for holding food therein for removal by feeding animals, said food trough defining drainage apertures therein to facilitate water drainage outwardly therefrom;
(2) a perch means located adjacent said food trough;

(3) supplementary retaining lip means fixedly mounted to the lower surface thereof to facilitate securement of additional of said food containers below said base member;

(c) a top member being engageable with respect to said upper rim edge means of said food container to facilitate protection thereof from undesirable environment conditions, said top member extending outwardly to cover said food trough located vertically therebelow, said top member including:

(1) a suspension bracket to facilitate hanging of the animal feeding device from trees and the like;

(2) a top retaining lip means detachably engageable with respect to said upper rim edge means to facilitate securement of said top member with respect to said food container;

(3) a closure stop immediately adjacent and above said top retaining lip means to facilitate firm securement of said top member with respect to said food container;

(d) a food distribution coupling attached with respect to said base member, said food distribution coupling being adapted to be detachable with respect to said lower rim edge means of said food container for movably retaining same with respect to said base member to facilitate selective distribution of food from said food reservoir thereof into said food trough, said food distribution coupling including:

(1) a food distribution chamber positioned below said food delivery opening of said food container being retained by said food distribution coupling, said food distribution chamber adapted to receive food from said food reservoir and supply same to move into said food trough;

(2) food distribution port means in communication with respect to said food distribution chamber and adapted to receive food therefrom for guiding movement of same into said food trough defined in said base member;

(3) a floor means within said food distribution chamber which is inclined toward said food distribution port means to facilitate food flow from said food distribution chamber outwardly through said food distribution port means;

(4) a retaining ring means attached with respect to said base member and including a base retaining lip means being detachably engageable with respect to said lower rim edge means of said food container to secure same movably with respect to said retaining ring means, said food container being specifically movable with respect to said retaining ring means between a food retaining position extending across and closing said food distribution port means and a food supplying position for releasing of food downwardly through said food delivery opening into said food distribution chamber therebelow to allow movement of food through said food distribution port means into said food trough, said retaining ring means being formed of flexibly resilient material to facilitate respective attachment and detachment of said food container thereto;

(e) squirrel protecting means comprising a grating means extending across said food trough to prevent squirrels from directly feeding therefrom while still allowing full access by birds; and (f) supplementary base members attachable to the lower edges of said additional food containers to allow tiering of said food troughs.

* * * * *